(12) United States Patent
Sandler

(10) Patent No.: US 8,301,855 B2
(45) Date of Patent: *Oct. 30, 2012

(54) ACTIVE-ACTIVE REMOTE CONFIGURATION OF A STORAGE SYSTEM

(75) Inventor: Kariel E. Sandler, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/273,367

(22) Filed: Oct. 14, 2011

(65) Prior Publication Data

US 2012/0036332 A1    Feb. 9, 2012

Related U.S. Application Data

(63) Continuation of application No. 12/192,255, filed on Aug. 15, 2008, now Pat. No. 8,069,322.

(51) Int. Cl.
G06F 12/00 (2006.01)
G06F 12/16 (2006.01)

(52) U.S. Cl. ............... 711/162; 711/170; 711/E12.001; 711/E12.103

(58) Field of Classification Search .................. 711/162, 711/170, E12.001, E12.103
See application file for complete search history.

(56) References Cited

U.S. PATENT DOCUMENTS

| | | |
|---|---|---|
| 6,502,205 B1 | 12/2002 | Yanai et al. |
| 7,076,690 B1 | 7/2006 | Todd et al. |
| 7,219,191 B2 | 5/2007 | Takamoto et al. |
| 7,219,202 B2 | 5/2007 | Satoyama et al. |
| 7,340,640 B1 | 3/2008 | Karr et al. |
| 2004/0073831 A1 | 4/2004 | Yanai et al. |
| 2004/0260736 A1 | 12/2004 | Kern et al. |
| 2005/0071589 A1 | 3/2005 | Tross et al. |
| 2005/0086249 A1 | 4/2005 | Keohane et al. |
| 2005/0193034 A1 | 9/2005 | Kitsuregawa et al. |
| 2005/0223267 A1 | 10/2005 | Fujibayashi |
| 2005/0268054 A1 | 12/2005 | Werner et al. |
| 2006/0010180 A1 | 1/2006 | Kawamura et al. |
| 2007/0168630 A1 | 7/2007 | Hirakawa et al. |
| 2008/0098321 A1 | 4/2008 | Krithivas |

*Primary Examiner* — Yong Choe
(74) *Attorney, Agent, or Firm* — Griffiths & Seaton PLLC

(57) ABSTRACT

A method for data storage, including configuring a first logical volume on a first storage system and a second logical volume on a second storage system. The second logical volume is configured as a mirror of the first logical volume, so that the first and second logical volumes form a single logical mirrored volume. The method also includes receiving at the second storage system a command submitted by a host to write data to the logical mirrored volume, and transferring the command from the second storage system to the first storage system without writing the data to the second logical volume. On receipt of the command at the first storage system, the data is written to the first logical volume. Subsequent to writing the data to the first logical volume, the data is mirrored on the second logical volume.

20 Claims, 6 Drawing Sheets

ACTIVE-ACTIVE REMOTE CONFIGURATION OF A STORAGE SYSTEM

REFERENCE TO RELATED APPLICATIONS

The present Application is a Continuation of U.S. patent application Ser. No. 12/192,255 filed on Aug. 15, 2008, which is incorporated herein by reference.

FIELD OF THE INVENTION

The present invention relates generally to data storage, and particularly to methods and systems for data storage in multiple data storage systems.

BACKGROUND

As data storage systems increase in size and complexity, there may be conflicting demands between the desire to provide systems that have no single point of failure, while using all of the resources available. Data systems may be coupled together to provide redundancy. If two storage systems are coupled to provide access to a common collection of data, but only one of the storage systems can be active, then the configuration is termed an active-passive coupling. Alternatively, the two storage systems may be arranged so that both storage systems may be accessed at the same time. Such a configuration is termed an active-active arrangement. Where a choice between the two arrangements is possible, typically an active-active arrangement may be preferred.

BRIEF SUMMARY

In an embodiment of the present invention, a method for storage is provided. The method consists of configuring a first logical volume on a first storage system and a second logical volume on a second storage system. The second logical volume is configured as a mirror of the first logical volume, so that the first and second logical volumes form a single logical mirrored volume.

A host submits a command, which is received at the second storage system, to write data to the logical mirrored volume. The command is transferred from the second storage system to the first storage system without writing the data to the second logical volume.

On receipt of the command at the first storage system, the data is written to the first logical volume, and subsequent to writing the data to the first logical volume, the data is mirrored on the second logical volume.

In an alternative embodiment of the present invention, data storage apparatus is provided. The apparatus includes a first storage system having a first logical volume and a second storage system having a second logical volume. The second logical volume is configured as a mirror of the first logical volume, so that the first and second logical volumes form a single logical mirrored volume.

The apparatus also includes a controller which is configured to receive at the second storage system a command submitted by a host to write data to the logical mirrored volume. The command is transferred from the second storage system to the first storage system without writing the data to the second logical volume. On receipt of the command at the first storage system, the data is written to the first logical volume, and subsequent to writing the data to the first logical volume, the data is mirrored on the second logical volume.

In a disclosed embodiment of the present invention, a computer software product for operating a storage system is provided. The product consists of a computer-readable medium having program instructions recorded therein. The instructions, when read by a computer, cause the computer to configure a first logical volume on a first storage system and a second logical volume on a second storage system. The instructions also cause the computer to configure the second logical volume as a mirror of the first logical volume so that the first and second logical volumes form a single logical mirrored volume. On receipt at the second storage system of a command submitted by a host to write data to the logical mirrored volume, the command is transferred from the second storage system to the first storage system without writing the data to the second logical volume. On receipt of the command at the first storage system, the data is written to the first logical volume, and subsequent to writing the data to the first logical volume, the data is mirrored on the second logical volume.

The present invention will be more fully understood from the following detailed description of the embodiments thereof, taken together with the drawings in which:

DETAILED DESCRIPTION OF EMBODIMENTS

Figure 1:
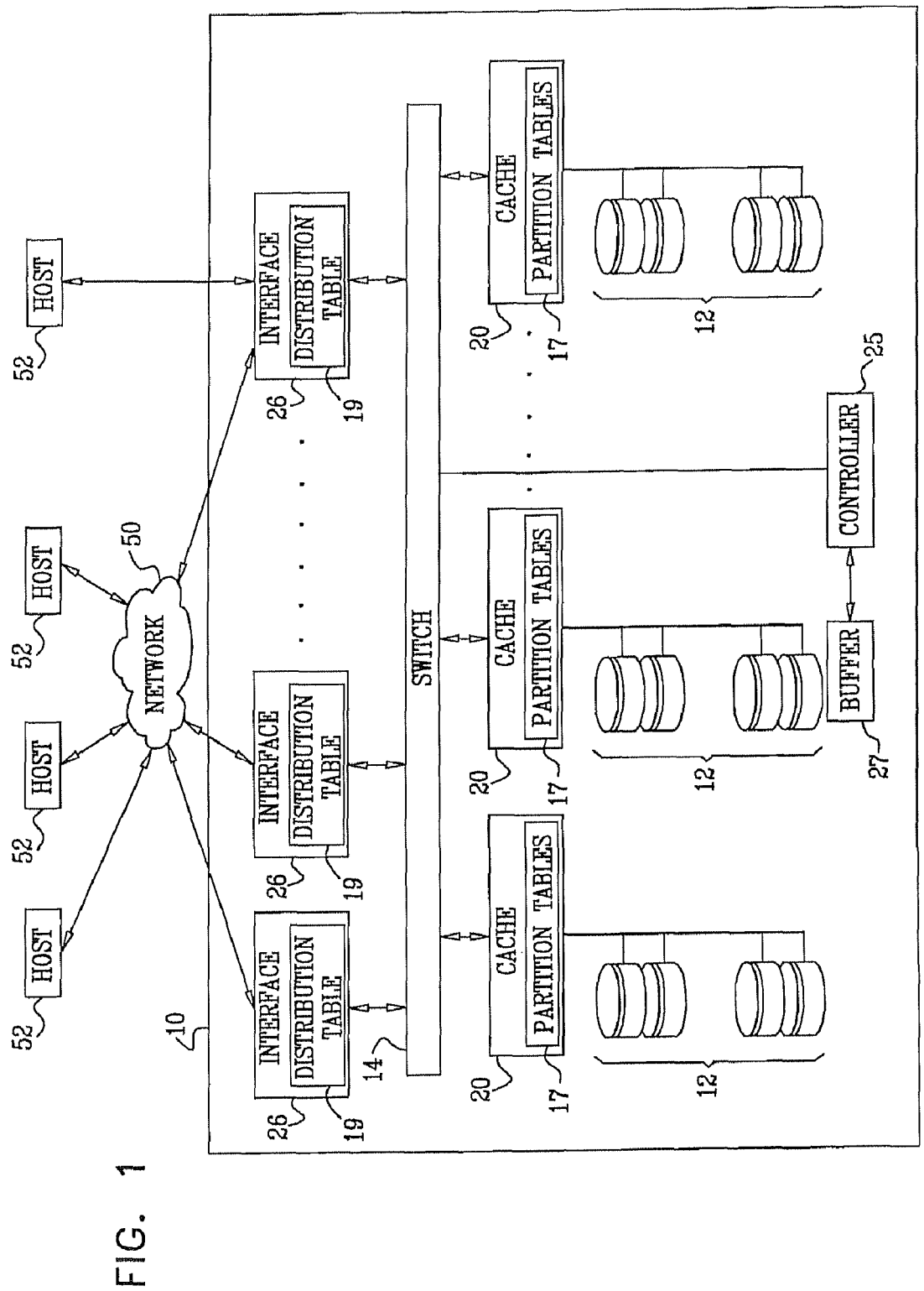
FIG. 1 shows a schematic block diagram of a storage system, according to an embodiment of the present invention.

Reference is now made to FIG. 1, which shows a schematic block diagram of a storage system 10, according to an embodiment of the present invention. System 10 may be configured to have any convenient topological configuration, including, but not limited to, a storage area network (SAN) configuration or a network attached storage (NAS) configuration. System 10 communicates with one or more hosts 52 by any means known in the art, for example, via a network 50 such as the Internet or by a bus, and communication between the system and the hosts may be by any suitable protocol, such as a TCP/IP (Transmission Control Protocol/Internet Protocol) protocol, a Fibre Channel protocol, a SCSI (Small Computer System Interface) protocol or an iSCSI (Internet Small Computer System Interface) protocol. Data is stored within system 10 in logical units (LUNs), also herein termed logical volumes, comprising sequences of logical blocks associated with logical addresses (LAs). The contents of these blocks is typically stored in a distributed way across a group of slow and/or fast access time, non-volatile mass storage devices 12, assumed here to be disks by way of example. Hosts 52 access the data stored in disks 12 via input/output (IO) requests, which comprise IO read requests and IO write requests. In an IO read request the requested data is read from one or more disks 12 wherein the data is stored. In an IO write request the data is written to one or more disks 12.

System 10 may comprise one or more substantially similar interfaces 26 which receive IO read and write requests requiring access to disks 12 from hosts 52. Each interface 26 may be implemented in hardware and/or software, and may be located in storage system 10 or alternatively in any other suitable location, such as an element of network 50 or one of hosts 52. Between disks 12 and the interfaces are a multiplicity of interim caches 20. Caches 20 are coupled to interfaces 26 by any suitable fast coupling system known in the art, such as a bus or a switch, so that each interface is able to communicate with, and transfer data to and from, each cache, which is in turn able to transfer data to and from its sub-group of disks 12 as necessary. By way of example, the coupling between caches 20 and interfaces 26 is herein assumed to be by a first cross-point switch 14. Interfaces 26 operate substantially independently of each other. Caches 20 and interfaces 26 operate as a data transfer system, transferring data between hosts 52 and disks 12.

Consecutive blocks of a LUN in system 10 are grouped into partitions, whose lengths are typically identical throughout the system. Thus a LUN comprises consecutive strings of logical partitions which in turn comprise consecutive strings of logical blocks.

By way of example, an overall system controller 25, typically comprising multiple processing units located in caches 20 and/or interfaces 26, is assumed to operate system 10. Typically, the multiple processing units use a collection of software which is distributed over caches 20 and interfaces 26, and which acts as one collective entity. Controller 25 is assumed to operate system 10 with the aid of a buffer 27. Inter alia, controller 25 assigns logical unit partitions to each cache 20, so that each cache is able to retrieve data from, and/or store data at, the range of LAs of its assigned partitions. The ranges are typically chosen so that the complete memory address space of disks 12 is covered. Other functions of controller 25 are described below.

The assigned partitions for each cache 20 are typically recorded in substantially similar tables 19 stored in each interface 26, and each table is used by its interface in routing IO requests from hosts 52 to the caches. Alternatively or additionally, the assigned partitions for each cache 20 are stored in each interface 26 in terms of a substantially similar function, or by any other suitable method known in the art for generating a correspondence between partitions and caches. The correspondence between caches and partitions is referred to as distribution table 19, and it will be understood here that table 19 gives each interface 26 a general overview of the complete cache address space of system 10. United States Patent Application Publication No. 2005/0015567, titled "Distributed Independent Cache Memory," which is incorporated herein by reference, describes a method that may be applied for generating tables such as table 19.

An IO request to access data is conveyed to a specific cache, and may be serviced by the cache itself, or by disks 12 connected to the cache. Thus, each cache acts on the IO requests conveyed to it substantially independently of the other caches; similarly, each cache communicates with its respective sub-group of disks substantially independently of communication between other caches and their respective sub-groups. Each cache 20 comprises a respective set of partition tables 17, specific to the cache.

Figure 2:
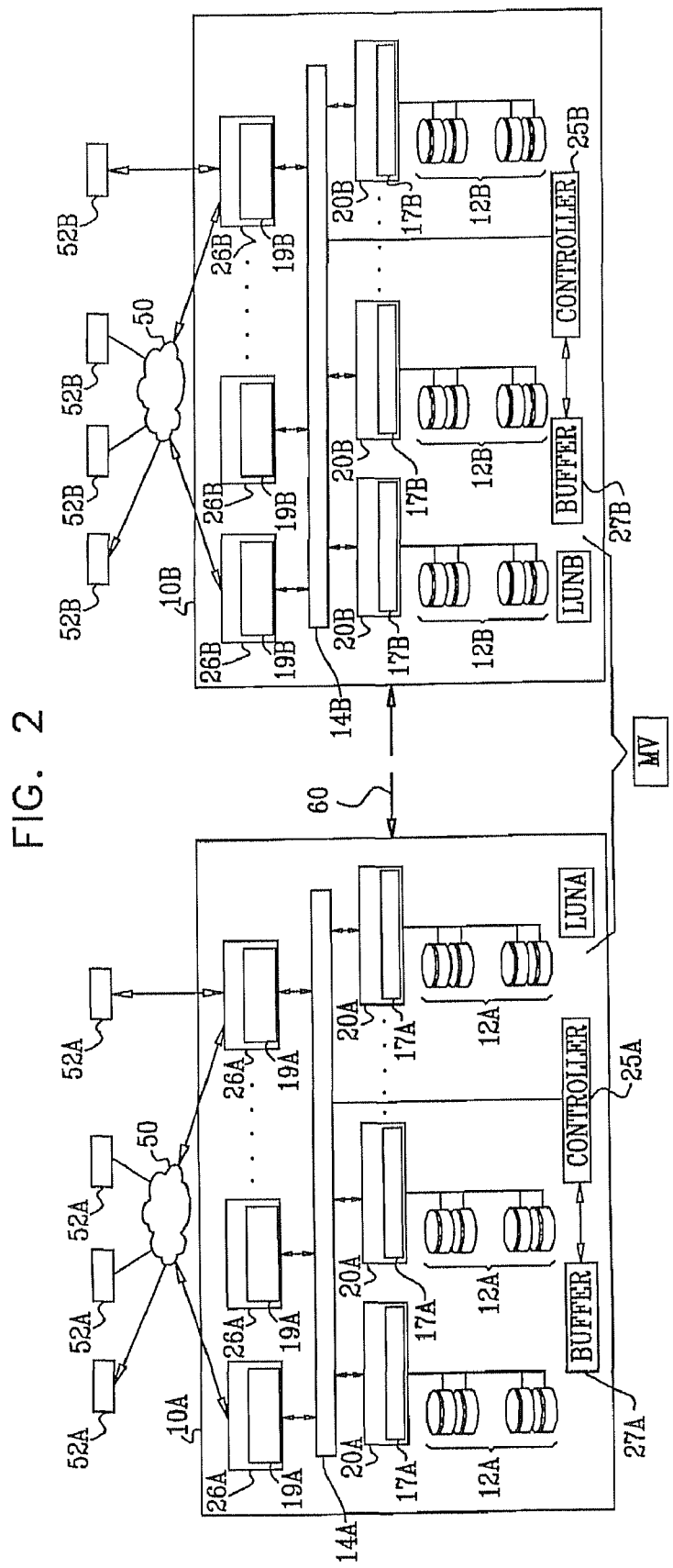
FIG. 2 is a schematic diagram of two storage systems which are coupled to each other, according to an embodiment of the present invention.

FIG. 2 is a schematic diagram of two storage systems 10A and 10B which are coupled to each other, according to an embodiment of the present invention. Storage systems 10A and 10B are both, by way of example, assumed to be generally similar to storage system 10, having generally similar elements. In the present disclosure the elements of each storage system and its respective hosts are differentiated from each other by the use of a suffix letter A or B.

Thus, storage system 10A comprises interfaces 26A, caches 20A, mass storage devices 12A, a system controller 25A and buffer 27A. In addition, hosts 52A and system 10A are configured to communicate with each other, so that hosts 52A can "see," i.e., communicate with, storage elements, such as logical volumes, of system 10A. Similarly, storage system 10B comprises interfaces 26B, caches 20B, mass storage devices 12B, a system controller 25B and buffer 27B. Hosts 52B and system 10B can communicate with each other, so that hosts 52B can see storage elements of system 10B. For clarity, some of the text describing elements has been omitted from FIG. 2.

Each storage system may be managed by a separate operator. Alternatively, and as assumed hereinbelow, one operator manages both systems. The two storage systems are coupled to each other, as explained in more detail below. The two systems may be close together physically, in which case they are typically used to increase the availability of storage resources to their hosts. Alternatively, the two systems may be physically well separated, by distances in a typical range of 100 km-1000 km, in which case they are typically used for disaster recovery. In both cases, one system takes over from the other in the event of one of the systems failing.

At least some of the respective hosts and storage systems are connected by a network, which may be separate networks, or as assumed here, may be a common network, assumed herein to be network 50. Although network 50 may be common, in FIG. 2 there are two depictions of the network to indicate that, except as described below, the two storage systems and their hosts are generally independent of each other. Thus, in some embodiments, hosts 52A cannot communicate with system 10B, and hosts 52B cannot communicate with system 10A. Alternatively, for example in the case of a failure of one of the systems, hosts 52A and 52B may communicate with the remaining "live" system.

As stated above, data is stored in systems 10A and 10B in logical volumes, LUNs. In embodiments of the present invention, at least some logical volumes in system 10A are mirrored by respective logical volumes in system 10B. The mirroring is accomplished via a channel 60 configured between the systems. Channel 60 may use a private or local protocol allowing data transfer between the systems, such a protocol being configured by the operator. Typically, channel 60 is a dedicated secure private channel, with a very high bandwidth.

The mirroring of the one or more volumes of system 10A by respective volumes in system 10B may be synchronous or asynchronous. In the following description, unless otherwise stated the mirroring is assumed to be synchronous. Those having ordinary skill in the art will be able to adapt the description, mutatis mutandis, for asynchronous mirroring.

A logical volume LUNA in storage system 10A is assumed to be "owned" by system 10A, i.e., may be accessed by controller 25A. A remote logical volume LUNB in storage system 10B is assumed to be owned by system 10B, i.e., may be accessed by controller 25B. LUNA is mirrored to LUNB, and the two volumes represent a single mirrored volume MV. In some embodiments of the present invention, at creation of a logical volume by the operator, the operator also assigns a primary system which is able to operate the mirrored volume, and may also assign one or more secondary systems that are able to operate the volume with permission from the primary system. By way of example, in the following description, except where otherwise indicated, logical mirrored volume MV is assumed to have system 10A as its primary system and system 10B as a secondary system.

Figure 3:
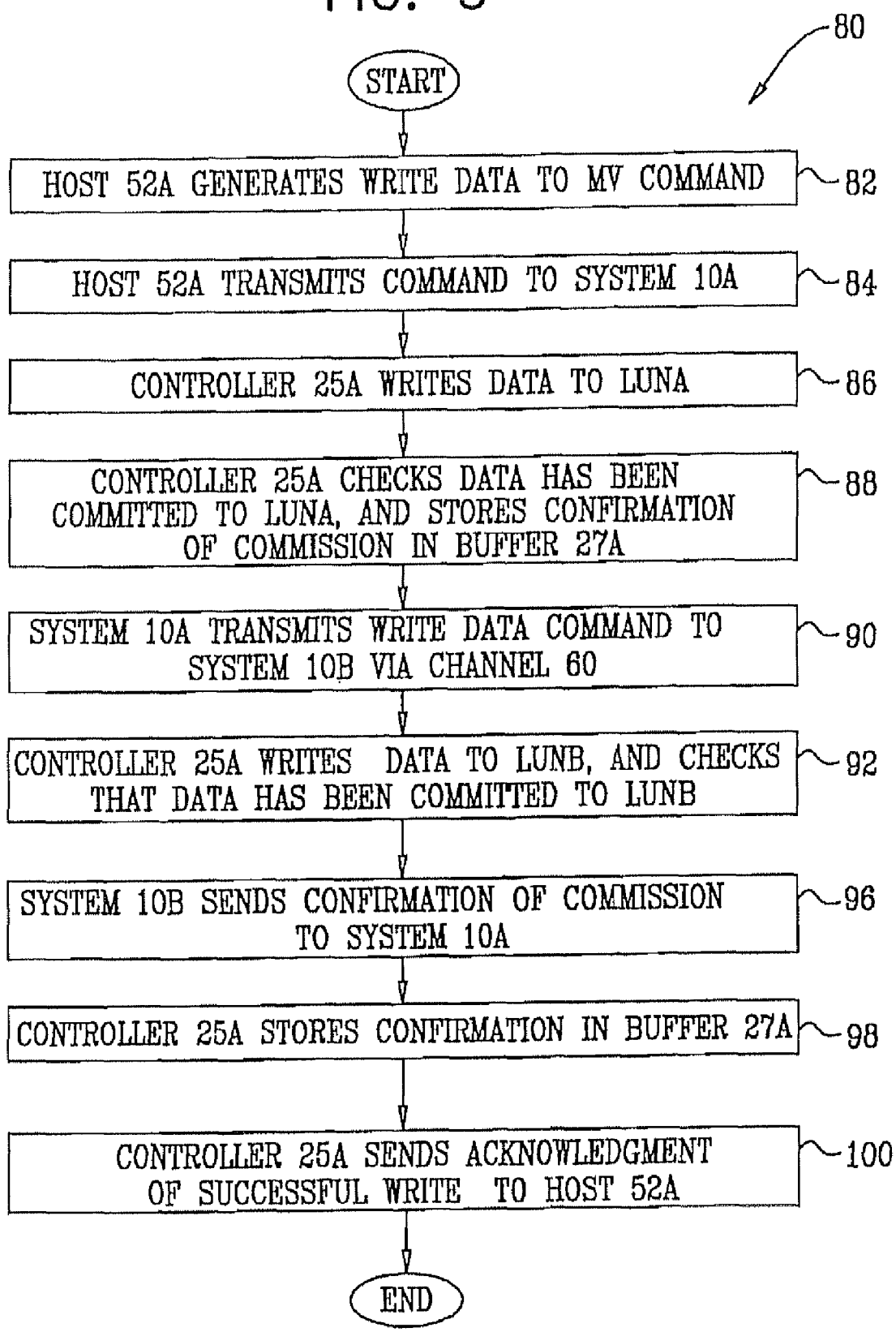
FIG. 3 is a flowchart showing steps of a first process for a host writing data to a logical volume.
Figure 4:
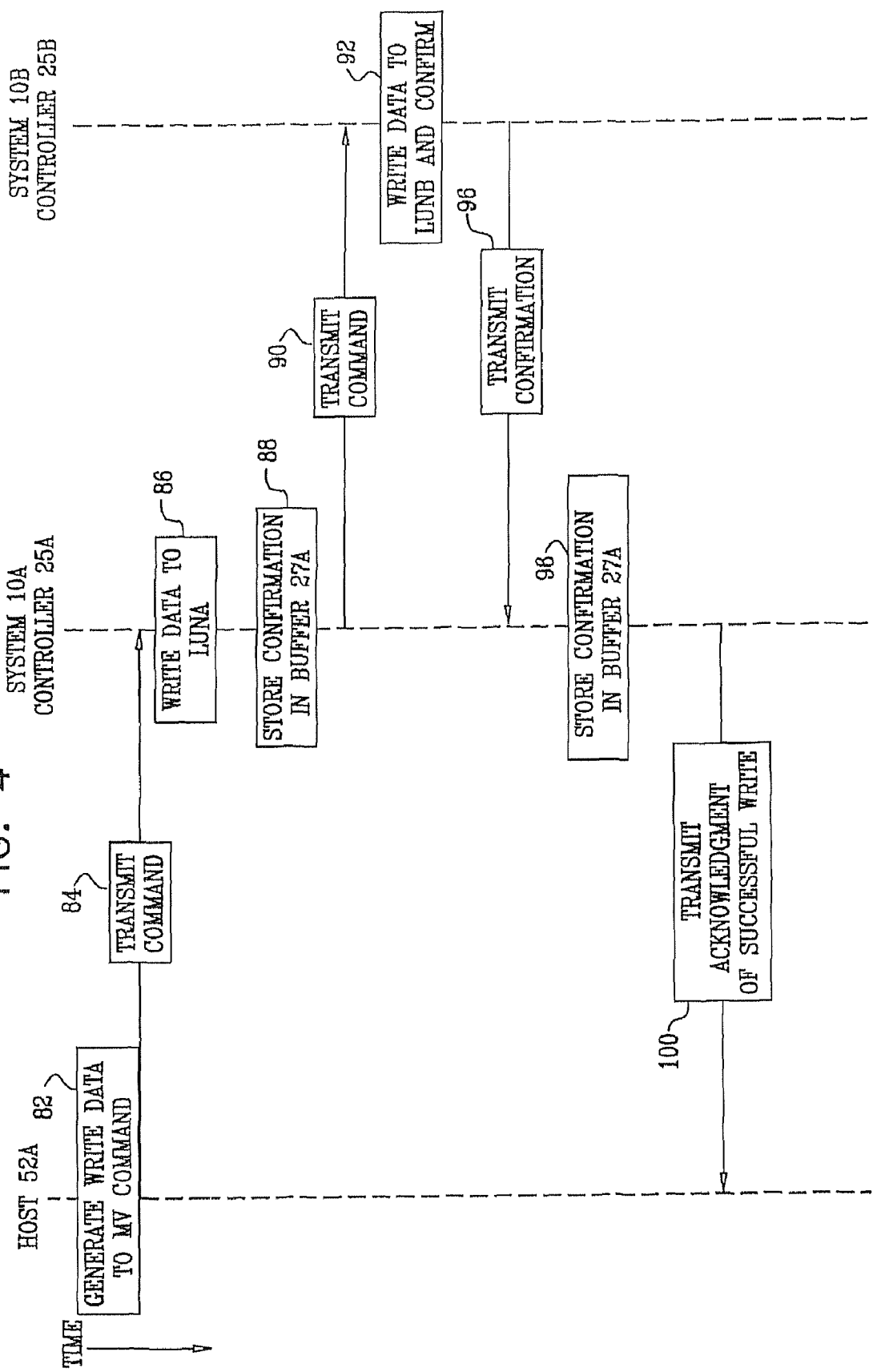
FIG. 4 is a corresponding timeline showing the timing of the steps of the first process, according to embodiments of the present invention.

FIG. 3 is a flowchart 80 showing steps of a process for host 52A writing data to mirrored volume MV, and FIG. 4 is a corresponding timeline showing the timing of the steps of the process, according to embodiments of the present invention. The process assumes that the data written to MV is synchronously mirrored on LUNA and LUNB.

In a first step 82 host 52A generates a command to write data to MV. In a transmit step 84 the host transmits the command to system 10A.

In a write data step 86 controller 25A, in the primary system of MV, writes the data to LUNA. In a confirmation step 88, controller 25A checks that the data has been correctly written, and stores a confirmation of the writing in buffer 27A.

In an inter-system transmit step 90 controller 25A transmits the write data command, via channel 60, to system 10B to initiate the mirroring process. Since system 10B is a secondary system of MV, controller 25A also transmits a permission to write to LUNB to system 10B.

In a write mirroring step 92 controller 25B writes the data to LUNB. Controller 25B checks that the data has been correctly written.

In an inter-system confirmation step 96, controller 25B sends confirmation to system 10A that the data has been written to LUNB correctly.

In a store confirmation step 98, controller 25A stores the confirmation from system 10B in buffer 27A.

In a final step 100, implemented when buffer 27A has confirmations that the data has been written to LUNA and LUNB, controller 25A transmits an acknowledgment that the write command has been successfully completed to host 52A.

Figure 5:
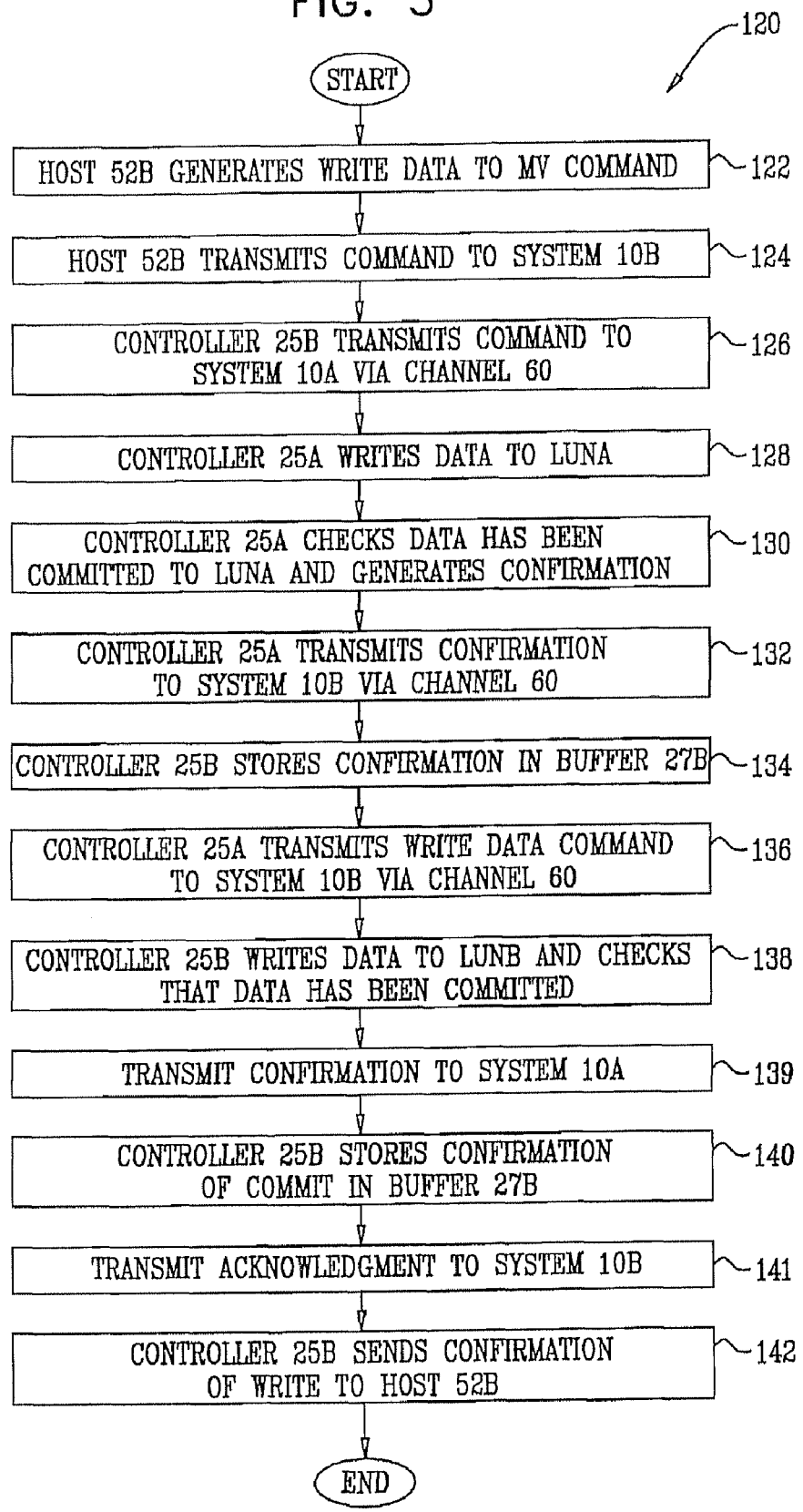
FIG. 5 is a flowchart showing steps of a second process for a host writing to a logical volume.
Figure 6:
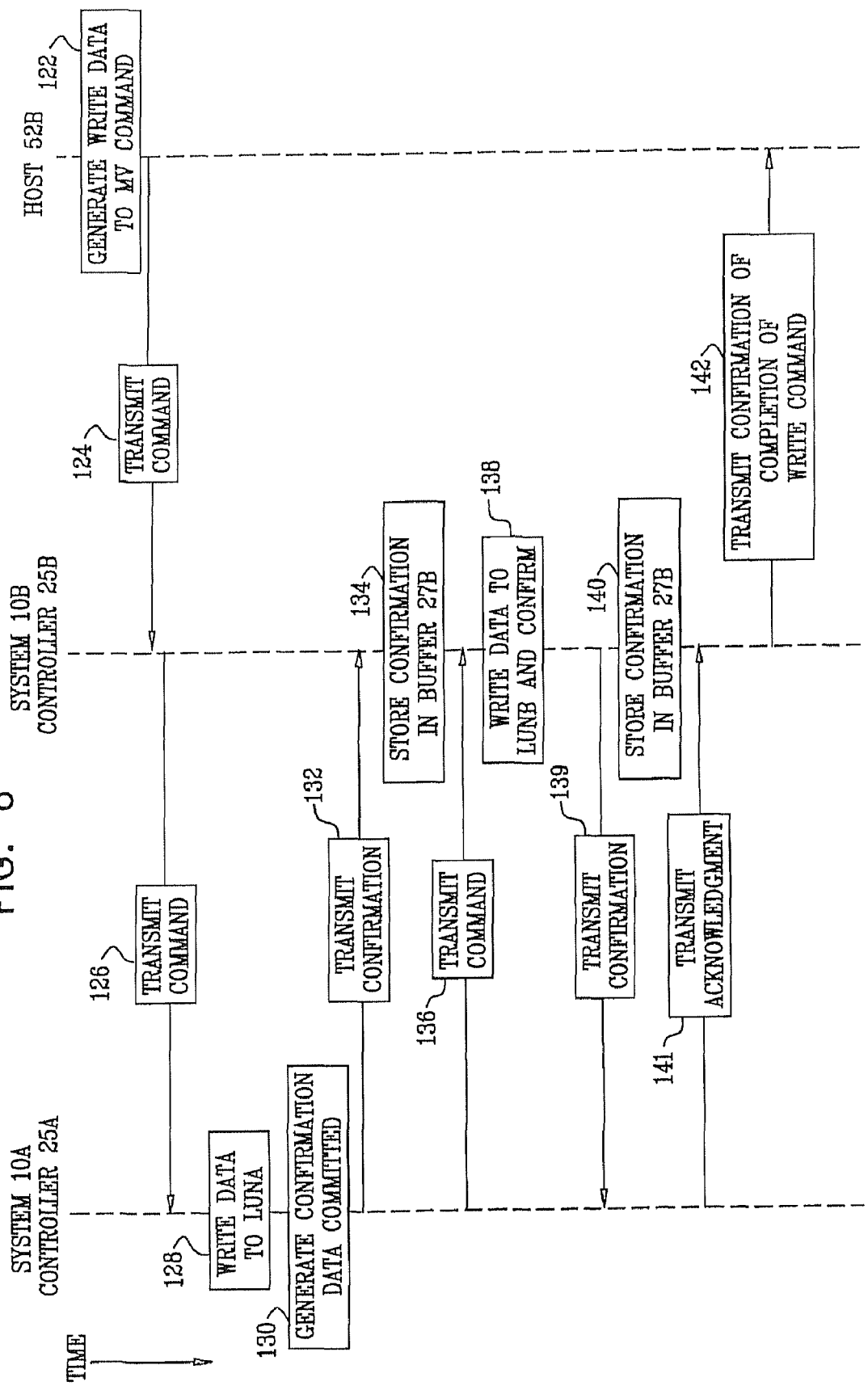
FIG. 6 is a corresponding timeline showing the timing of the steps of the second process, according to embodiments of the present invention.

FIG. 5 is a flowchart 120 showing steps of a process for host 52B writing to mirrored volume MV, and FIG. 6 is a corresponding timeline showing the timing of the steps of the process, according to embodiments of the present invention. The process assumes that the primary system for MV has been set to be system 10A, and that system 10B is set as a secondary system. Thus, controller 25B may not write to LUNB without permission from system 10A.

In a first step 122, host 52B generates a command to write data to mirrored volume MV. In a transmit step 124 the host transmits the write command to system 10B.

In an inter-system transmit step 126, system 10B, since it is a secondary system of MV, does not have permission to write to LUNB. Consequently, system 10B transmits the write command to system 10A.

In a write step 128, controller 25A interprets the command to write to mirrored volume MV as a command to write the data to LUNA. Controller 25A in the primary system of MV writes the data to LUNA.

In a confirmation step 130, controller 25A checks that the data has been correctly written to LUNA and generates a confirmation of the commitment of the data.

In an inter-system transmit step 132, controller 25A transmits the confirmation to system 10B, and in a store step 134, controller 25B stores the confirmation in buffer 27B.

In an inter-system transmit mirror command step 136, controller 25A transmits the write data command to system 10B, so that data which in step 128 has been stored in LUNA will be mirrored by LUNB. In addition, controller 25A transmits a permission to write to LUNB to controller 25B.

In a write mirroring step 138, controller 25B writes the data to LUNB and checks that the data has been correctly written. In a confirmation step 139, system 10B sends a confirmation to system 10A that the data has been correctly written in system 10B. In addition, in a store confirmation step 140, the controller stores confirmation that the data has been correctly written in buffer 27B.

In an acknowledgment step 141, system 10A acknowledges to system 10B of the confirmation received in step 139.

In a final step 142, implemented when buffer 27B has confirmation that the data has been written to LUNA and LUNB, controller 25B transmits an acknowledgment to host 52B that the write command to MV has successfully completed.

The processes described by FIGS. 3, 4, 5 and 6 illustrate that mirrored volume MV is visible to all hosts.

The process described by FIGS. 5 and 6 reflects a synchronous relationship between systems 10A and 10B. The synchronicity is reflected in steps 130-140. Substantially the same process may work in an asynchronous relationship, whereby the steps 132-140 are either queued to execute as a parallel process, or are managed by a controller's algorithm for asynchronous data mirroring. In a synchronous relationship, if one of the systems fails, all operations are routed through the remaining "live" system. If the relationship is asynchronous, then the remaining live system is typically locked when the other system fails, and may be unlocked after a notice has been given, or when the systems have been synchronized up to the point of failure.

Consideration of the above description shows that LUNA is mirrored by LUNB, while the unified logical image MV may be written to by hosts coupled to both systems, system 10A and system 10B. The above description has assumed that access to LUNA and LUNB is by way of a write request, and illustrates that system 10B is effectively used as a proxy for transferring commands. It will be apparent to those having ordinary skill in the art that read requests to MV may be handled in substantially the same manner as is described here for write requests. Thus, read requests arriving at system 10B use system 10B as a proxy to send the requests to system 10A, where they are executed in generally the same way as has been described for write requests. Consequently, LUNA and LUNB are in an active-active configuration for access that comprises both read and write requests.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described herein with reference to flow chart illustrations and/or block diagrams of methods, apparatus (systems) and computer program products according to embodiments of the invention. It will be understood that each block of the flow chart illustrations and/or block diagrams, and combinations of blocks in the flow chart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow charts and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flow charts and/or block diagram block or blocks.

The flow charts and block diagrams in the Figures illustrate the architecture, functionality, and operation of possible implementations of systems, methods and computer program products according to various embodiments of the present invention. In this regard, each block in the flow charts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flow chart illustrations, and combinations of blocks in the block diagrams and/or flow chart illustrations, can be implemented by special purpose hardware-based systems that perform the specified functions or acts, or combinations of special purpose hardware and computer instructions.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art.

The invention claimed is:

1. A method for storing data in a computing system including a primary storage system and a secondary storage system in communication with the primary storage system, the method comprising:
   receiving, at the secondary storage system, from a host a command to write data to the secondary storage system;
   transmitting the command to the primary storage system;
   writing the data to the primary storage system; and
   writing the data to the secondary storage system subsequent to writing the data to the primary storage system, wherein:
      the secondary storage system is configured to receive a write permission from the primary storage system,
      subsequent to receiving the write permission, the secondary storage system is configured to write to the secondary storage system, and
      the primary storage system is configured to write to the secondary storage system without permission.

2. The method of claim 1, wherein writing the data to the secondary storage system comprises synchronously writing the data to the secondary storage system.

3. The method of claim 1, wherein writing the data to the secondary storage system comprises asynchronously writing the data to the secondary storage system.

4. The method of claim 1, wherein the host is configured to communicate with the secondary storage system and not to communicate with the primary storage system.

5. The method of claim 4, wherein communication between the host and the secondary storage system is via a Fibre Channel protocol.

6. The method of claim 4, wherein communication between the host and the secondary storage system is via a Small Computer System Interface protocol.

7. The method of claim 4, wherein communication between the host and the secondary storage system is via an Internet Small Computer System Interface protocol.

8. The method of claim 1, wherein one of the primary storage system and the secondary storage system is configured as a storage area network.

9. The method of claim 1, wherein one of the primary storage system and the secondary storage system is configured in a network attached storage configuration.

10. A storage system, comprising:
a primary storage system comprising a primary logical volume;
a secondary storage system comprising a secondary logical volume, wherein the secondary logical volume is configured as a mirror of the primary logical volume, so that the primary and secondary logical volumes form a single logical mirrored volume; and
a controller which is configured to:
receive, at the secondary storage system, from a host a command to write data to the secondary storage system,
transmit the command to the primary storage system,
write the data to the primary storage system, and
write the data to the secondary storage system subsequent to writing the data to the primary storage system, wherein:
the secondary storage system is configured to receive a write permission from the primary storage system,
subsequent to receiving the write permission, the secondary storage system is configured to write to the secondary logical volume, and
the primary storage system is configured to write to the secondary logical volume without permission.

11. The storage system of claim 10, wherein writing the data to the secondary storage system comprises synchronously writing the data to the secondary storage system.

12. The storage system of claim 10, wherein writing the data to the secondary storage system comprises asynchronously writing the data to the secondary storage system.

13. The storage system of claim 10, wherein the host is configured to communicate with the secondary storage system and not to communicate with the primary storage system.

14. The storage system of claim 13, wherein communication between the host and the secondary storage system is via one of a Fibre Channel protocol, a Small Computer System Interface protocol, and an Internet Small Computer System Interface protocol.

15. The storage system of claim 10, wherein one of the primary storage system and the secondary storage system is configured as a storage area network.

16. The storage system of claim 10, wherein one of the primary storage system and the secondary storage system is configured in a network attached storage configuration.

17. A computer software product for storing data in a computing system including a primary storage system and a secondary storage system in communication with the primary storage system, the product comprising a non-transitory computer-readable medium having program instructions recorded therein, which instructions, when read by a computer, cause the computer to:
receive, at the secondary storage system, from a host a command to write data to the secondary storage system;
transmit the command to the primary storage system;
write the data to the primary storage system; and
write the data to the secondary storage system subsequent to writing the data to the primary storage system, wherein:
the secondary storage system is configured to receive a write permission from the primary storage system,
subsequent to receiving the write permission, the secondary storage system is configured to write to the secondary storage system, and
the primary storage system is configured to write to the secondary storage system without permission.

18. The computer software product of claim 17, wherein the instructions, when read by the computer, further cause the computer to communicate with the secondary storage system and not to communicate with the primary storage system.

19. The computer software product of claim 18, wherein communication between the host and the secondary storage system is via one of a Fibre Channel protocol, a Small Computer System Interface protocol, and an Internet Small Computer System Interface protocol.

20. The computer software product of claim 19, wherein writing the data to the secondary storage system comprises one of synchronously and asynchronously writing the data to the secondary storage system.

* * * * *